(12) United States Patent
Ekas

(10) Patent No.: US 10,046,461 B2
(45) Date of Patent: Aug. 14, 2018

(54) LINK STRUCTURE AND ASSEMBLY INCLUDING CABLE GUIDE SYSTEM FOR ROBOTIC MECHANICAL MANIPULATOR STRUCTURE

(71) Applicant: Paul Ekas, Redwood City, CA (US)

(72) Inventor: Paul Ekas, Redwood City, CA (US)

( * ) Notice: Subject to any disclaimer, the term of this patent is extended or adjusted under 35 U.S.C. 154(b) by 351 days.

(21) Appl. No.: 14/835,351

(22) Filed: Aug. 25, 2015

(65) Prior Publication Data

US 2016/0052129 A1  Feb. 25, 2016

Related U.S. Application Data

(63) Continuation-in-part of application No. 14/834,178, filed on Aug. 24, 2015.

(60) Provisional application No. 62/041,332, filed on Aug. 25, 2014, provisional application No. 62/087,664, filed on Dec. 4, 2014, provisional application No. 62/165,080, filed on May 21, 2015, provisional application No. 62/165,074, filed on May 21, 2015.

(51) Int. Cl.
*B25J 15/00* (2006.01)
*B25J 9/10* (2006.01)
*B25J 15/10* (2006.01)

(52) U.S. Cl.
CPC .......... *B25J 15/0009* (2013.01); *B25J 9/104* (2013.01); *B25J 15/10* (2013.01); *Y10S 901/21* (2013.01)

(58) Field of Classification Search
CPC ......... B25J 15/0009; B25J 9/104; B25J 15/10
See application file for complete search history.

(56) References Cited

U.S. PATENT DOCUMENTS

| | | |
|---|---|---|
| 5,570,920 A | 11/1996 | Crisman et al. |
| 2005/0102037 A1 | 5/2005 | Matsuda |
| 2005/0218679 A1 | 10/2005 | Yokoyama et al. |
| 2006/0131908 A1 | 6/2006 | Tadano |
| 2006/0142102 A1 | 6/2006 | Radocaj |
| 2007/0089557 A1* | 4/2007 | Solomon ............... B25J 9/1045 74/490.01 |
| 2008/0000317 A1* | 1/2008 | Patton ................ A61F 5/0102 74/500.5 |

(Continued)

FOREIGN PATENT DOCUMENTS

| | | |
|---|---|---|
| EP | WO 2009080373 | 7/2009 |
| JP | 2010110846 | 5/2010 |

(Continued)

OTHER PUBLICATIONS

Korean Intellectual Property Office, International Search Report issued in PCT/US2015/046596, dated Oct. 29, 2015, 3 pages.

(Continued)

*Primary Examiner* — David M Fenstermacher
(74) *Attorney, Agent, or Firm* — Glass & Associates; Kenneth Glass; Kenneth D'Alessandro

(57) ABSTRACT

A robotic mechanical manipulator structure includes a first link and a second link rotatably coupled to the first link by a rotatable joint. A first high hardness cable guide is disposed in the first link. A first cable is connected between the first link and the second link to move the first link relative to the second link in a first direction around the joint, the first cable connected to the first link at a first anchor point, and passing through the first high hardness cable guide in the second link.

20 Claims, 8 Drawing Sheets

(56) References Cited

U.S. PATENT DOCUMENTS

| | | |
|---|---|---|
| 2009/0018670 A1 | 1/2009 | Puchhammer |
| 2010/0061835 A1 | 3/2010 | Sim |
| 2011/0068595 A1 | 3/2011 | Ihrke et al. |
| 2011/0162467 A1* | 7/2011 | Niccolai ............... F16H 35/00 74/53 |
| 2011/0167945 A1* | 7/2011 | Yang ..................... B25J 9/104 74/490.04 |
| 2012/0186383 A1 | 7/2012 | Schvalb et al. |
| 2014/0097631 A1 | 4/2014 | Ciocarlie et al. |

FOREIGN PATENT DOCUMENTS

| | | |
|---|---|---|
| JP | 2010110846 | 5/2015 |
| JP | 2005351476 | 12/2015 |
| KR | 101117253 | 3/2012 |
| KR | 101186806 | 9/2012 |
| WO | 1984004722 | 6/1984 |
| WO | 2003/013783 | 2/2003 |
| WO | 2009/080373 | 7/2009 |

OTHER PUBLICATIONS

Korean Intellectual Property Office, Written Opinion issued in PCT/US2015/046596, dated Oct. 29, 2015, 12 pages.
Korean Intellectual Property Office, International Search Report issued in PCT/US2015/046599, dated Nov. 3, 2015, 3 pages.
Korean Intellectual Property Office, Written Opinion issued in PCT/US2015/046599, dated Nov. 3, 2015, 10 pages.
Korean Intellectual Property Office, International Search Report issued in PCT/US2015/046603, dated Oct. 22, 2015, 3 pages.
Korean Intellectual Property Office, Written Opinion issued in PCT/US2015/046603, dated Oct. 22, 2015, 9 pages.
Korean Intellectual Property Office, International Search Report issued in PCT/US2015/046606, dated Nov. 3, 2015, 3 pages.
Korean Intellectual Property Office, Written Opinion issued in PCT/US2015/046606, dated Nov. 3, 2015, 8 pages.
Korean Intellectual Property Office, International Search Report issued in PCT/US2015/046780, dated Nov. 3, 2015, 3 pages.
Korean Intellectual Property Office, Written Opinion issued in PCT/US2015/046780, dated Nov. 3, 2015, 17 pages.

* cited by examiner

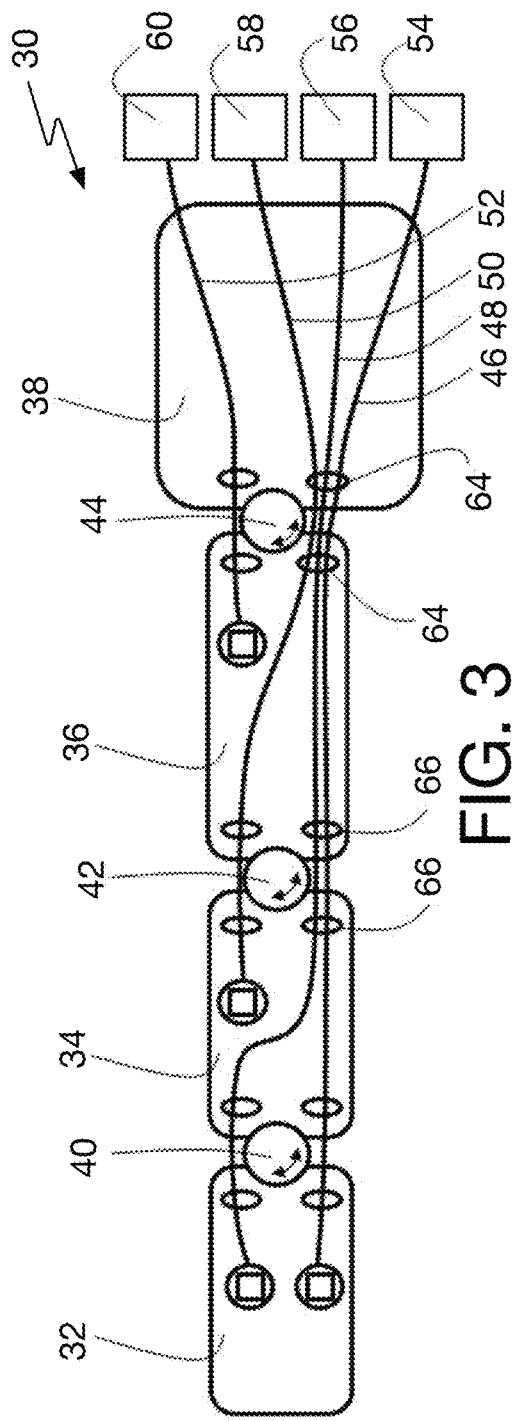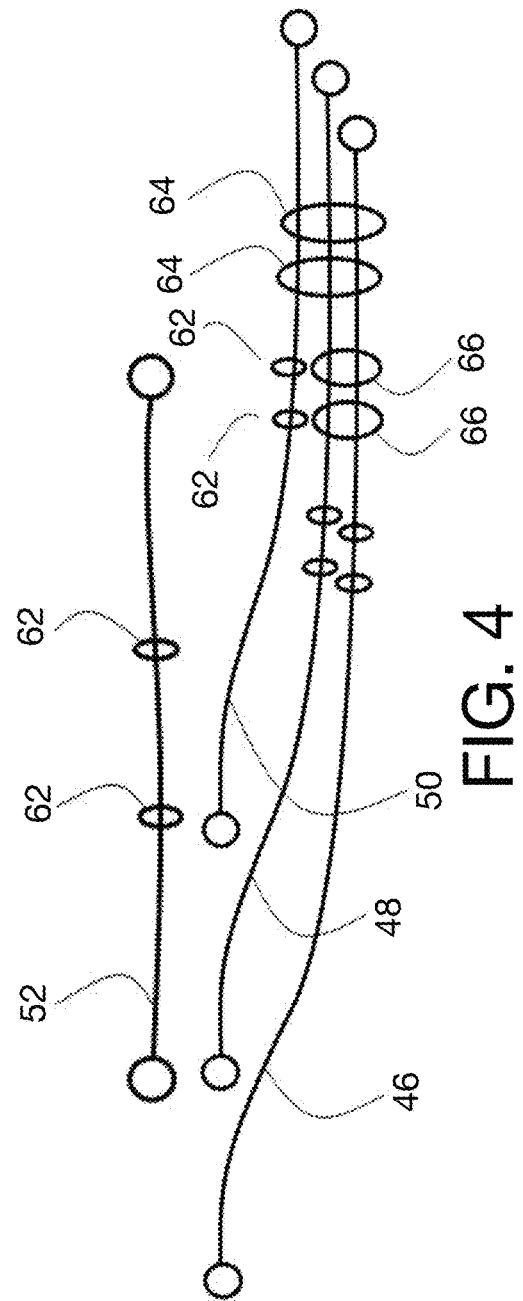

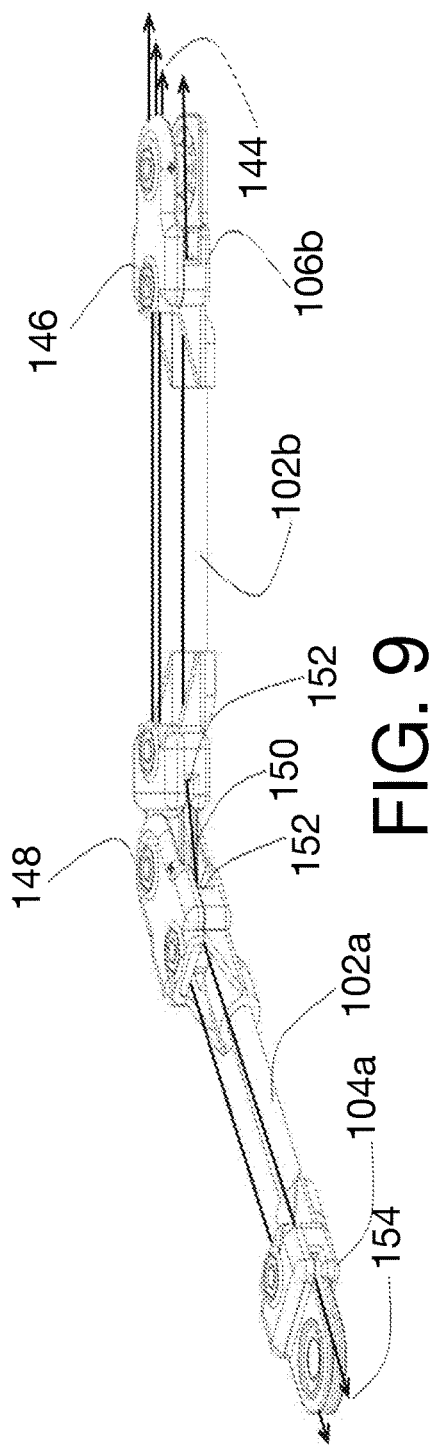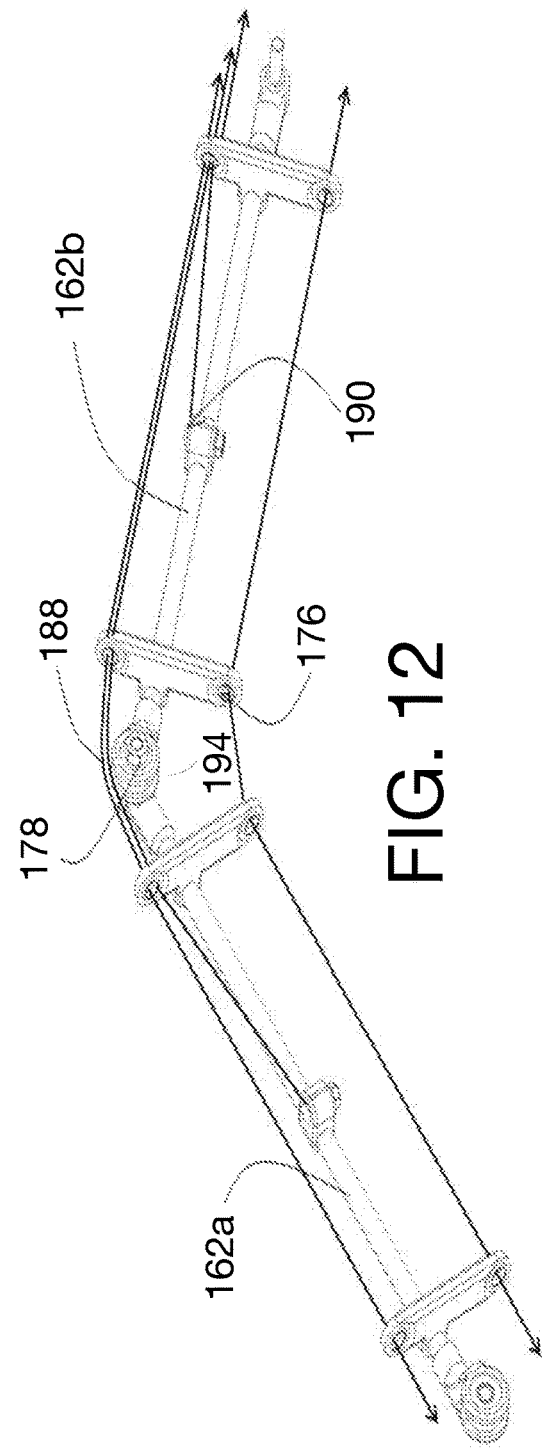

LINK STRUCTURE AND ASSEMBLY INCLUDING CABLE GUIDE SYSTEM FOR ROBOTIC MECHANICAL MANIPULATOR STRUCTURE

CROSS REFERENCE TO RELATED APPLICATIONS

This application is a continuation-in-part of U.S. patent application Ser. No. 14/834,178 for "Link Structure and Assembly Including Cable Guide System for Robotic Mechanical Manipulator Structure," filed Aug. 24, 2015 which claims the benefit of U.S. Provisional Patent Application No. 62/041,332 for "Cable Guide System for Robotic Mechanical Manipulator Structure," filed Aug. 25, 2014; Provisional Patent Application No. 62/087,664 for "Tendon Configuration for Under-Actuated Robotic Manipulator With Progressive Wrapping Links," filed Dec. 4, 2014; Provisional Patent Application No. 62/165,080 for "Tendon Configuration for Under-Actuated Robotic Manipulator With Progressive Wrapping Links," filed May 21, 2015; and Provisional Patent Application No. 62/165,074 for "Apparatus and Method for Attaching Apparatus to Robotic Fingers," filed May 21, 2015, the contents of all of which are incorporated in this disclosure by reference in their entirety.

BACKGROUND

Field of the Invention

The present invention relates in general to mechanical manipulators and appendages for use in robotics applications.

The Prior Art

The mechanical manipulator of an industrial robot is commonly implemented as a serial link structure utilizing revolute joints. The links are the rigid members coupled to each other by the joints. The joints (also called axis) are the movable components of the robot that enable relative motion between adjacent links.

Joint rotation is usually powered by motors, hydraulics or pneumatic actuators. In larger mechanical manipulators, these actuators can be directly connected to or within the joint to directly impart torque when actuated. When mechanical manipulators get very small, such as in use for "fingers" in mechanical hands, providing the motors, hydraulics and pneumatics directly attached to the joint is impractical due to size constraints and mass impacts on the moment of inertia. An alternative that is widely used is to utilize cables as artificial tendons that transfer the rotational force back to remotely located actuation such as a motor or pneumatic actuator.

When cables are used in mechanical manipulators, the cables need to be routed through the links and joints to the remotely located actuators. The cables may move in the links and joints when the mechanical manipulators are moving. The cables pass through the links and joints and may change direction at various points. At these points where the direction of the cable must change, it is important to reduce friction as much as possible to minimize wear and maximize resulting forces through the cable.

Routing tension cables in mechanical manipulators as described above requires overcoming friction while directing the path of the cable throughout any rotation of the links. There are three primary solutions for routing tension cables in mechanical manipulators: pulley based systems, the use of a Bowden cable or routing the cable over pins and bearings.

A very low friction configuration utilizes pulleys to route the cables. However, because a pulley is required wherever a cable must change direction, this can result in a large number of pulleys, which are mechanically complicated to implement, have high costs, and consume significant volume. In addition, if the cable falls off the pulley, the system has broken.

A more common configuration utilizes a Bowden cable, which is a cable mechanism utilizing a thin stranded cable that moves inside of a flexible outer housing. A Bowden cable provides an easy mechanism to route a cable through a confined area with little regard to position and obstacles. However, Bowden cables are relatively high friction and their performance degrades significantly over time.

Another common configuration is to run cables over metal pins or bearing races. This approach generally does not provide adequate alignment of the cable and can allow rubbing of the cable against the body of the link. This can result in high friction and wear in the mechanical manipulator reducing performance and operating lifetime.

Many other mechanical systems utilize cables to transmit tension between moving parts unrelated to link and joint based movement. These systems may experience similar challenges to those described above including: friction, wear, cost, and weight.

Ceramic guides have been widely used in the textile industry to route thread and yarn through machines. The primary reason for using ceramic guides has been to reduce lint build-up in textile factories.

Ceramic guides are used in fishing rods to reduce wear on the fishing line and rod.

SUMMARY

According to a first aspect of the invention, the cables used to transmit tension in a robot are routed through a series of high hardness cable guides to direct the cable path and force.

According to a second aspect of the invention, cables assemblies can be pre-assembled including the high hardness cable guides, termination rings, springs, if required, and other components into finished, calibrated cables.

According to a third aspect of the invention, the pre-assembled cables can be terminated with knots, rings, blocks or other methods to allow connection of the cable to the link, actuator, or another cable.

According to a fourth aspect of the invention, each link may be constructed out of two or more mating pieces. The pieces have pre-molded locations for the eyelets, and additionally if required anchor points for the cables, locations for springs and paths for the cables to traverse the link, joint hardware such as bearings and any other hardware such as sensors. When joined, the pieces securely embed the eyelets, springs, anchor points, cables and joint hardware.

According to a fifth aspect of the invention, each link may be constructed from a rod or bar, on which cable guides and terminations, and joints may be affixed.

According to a sixth aspect of the invention, the cables with cable guides can be used to apply tension between any two points in a structure where cable movement at intermediate points in the cable relative to the structure is expected.

According to a seventh aspect of the invention, the routing of the cable can utilize a combination of the cable guides as well as other methods to route the tension of the cable through a structure including the outside race surface of a ball bearing joint, a post or pin, a pulley or any other methods.

BRIEF DESCRIPTION OF THE DRAWING FIGURES

FIG. 3 is a diagram showing an embodiment of the present invention applied to a link, joint and cable configuration developed by Stanford University and the Jet Propulsion Laboratory.

FIG. 4 is a diagram showing an embodiment of the present invention wherein two cable assemblies with high hardness cable guides and termination points are shown that address the configuration in FIG. 3.

FIG. 9 is a diagram showing an isometric view of two links of the type shown in FIGS. 7 and 8 coupled together at a center joint.

FIG. 12 is a diagram showing an isometric view of two links of the type shown in FIGS. 10 and 11 coupled together at a center joint.

DETAILED DESCRIPTION

Persons of ordinary skill in the art will realize that the following description of the present invention is illustrative only and not in any way limiting. Other embodiments of the invention will readily suggest themselves to such skilled persons.

Figure 1:
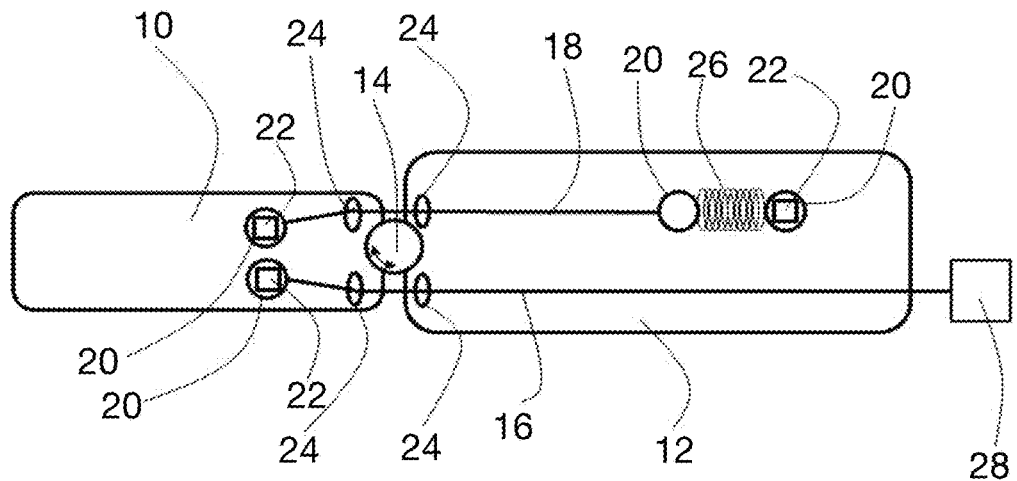
FIG. 1 is a diagram showing an embodiment of the present invention wherein two links are connected together through a joint and cables are in place to rotate the link around the joint.

Referring now to FIG. 1, a diagram shows an illustrative embodiment of the present invention wherein two links 10 and 12 connected by a joint 14 and controlled by two cables 16 and 18. The links 10 and 12 rotate about the joint 14 controlled by torques induced by the cables 16 and 18. The cables 16 and 18 have termination fittings 20 secured to the links 10 and 12 at anchor points 22. In one embodiment of the invention, the attachment points are in the form of attachment rings that nest into anchor points 22 in links 10 and 12. The cables 16 and 18 pass through cable guides 24 secured into the links 10 and 12 at points where the cables 16 and 18 need to be guided through the links 10 and 12 or exert force on the links 10 and 12. No-limiting examples of cable materials suitable for use in the present invention include super strong and low stretch synthetic materials, such as sold under the trademark Dyneema, available from Royal DSM of Heerlen, Netherlands, and ultra-high molecular weight polyethylene braided line sold under the trademark Spectra, available from Honeywell International, Inc., of Morristown, N.J.

In one embodiment of the invention, the cable guides 24 are high hardness cable guides. As used herein, the term "high hardness" refers to a material having a hardness greater than 600 HB (HBW 10/3000) on the Brinell Hardness scale. High hardness cable guides can be implemented using a variety of very hard materials. Non-limiting examples of such materials include ultra-hard ceramics including aluminum oxide, zirconium dioxide, titanium dioxide, polycrystalline sapphire and silicon carbide.

In the different embodiments of the invention, the cable guides 24 may take the form of eyelets and permutations thereof including, but not limited to, slotted, grooved, flanged, double flanged, tube, and other configurations. The cable guides 24 may also take the form of other types of guides and permutations thereof, including, but not limited to, traverse, trap, slit, roller, bearing rollers, pigtails, faller eyes and other configurations. Illustrative cable guides that are suitable for use in the present invention are disclosed in the publication Ascotex, Ceramic Yarn Guides, available at the web page http://www.ascotex.com/Binder2.pdf.

In the exemplary embodiment depicted in FIG. 1, one of the cables 18 is attached to an inline spring 26. The other cable 16 is connected to an actuator 28 that exerts tension on the cable 16 to cause rotational movement of the links 10 and 12 around the joint 14. Persons of ordinary skill in the art will appreciate that cable 18 can be eliminated and the end of spring 26 can instead be anchored to link 10. Such skilled persons will also appreciate that spring 26 can be eliminated and cable 18 can be controlled by a second actuator (not shown) working in cooperation with actuator 28.

The cables 16 and 18 transfer forces between their termination fittings 20 which can be attached to links 10 and 12, springs 26, actuators 28, or other sources of passive or active tension on the cables 16 and 18. The cables 16 and 18 are thus constructed to connect to these various points of the structure including links 10 and 12, the actuators 28 and the springs 26 to transfer and apply that force through the structure. The force of the cables 16 and 18 will be applied to the link 10 and 12 and joint 14 structure through its termination points 22 and also where the cable is redirected through cable guides 24. These points where the cables 16 and 18 are redirected generally require dynamic movement of the cable relative to the structure including links 10 and 12 and joint 14. At these points, the cable guides 24 are used to provide a low wear and low resistance method to change the direction of cables 16 and 18. The cable guides 24 are securely attached to the links 10 and 12. At these points of redirection, forces are also applied to the structure including links 10 and 12 and joint 14. When the tension applied to cables 16 and 18 is increased, the stiffness of the structure including links 10 and 12 and joint 14 increases as well. In this configuration, when the actuator 28 increases tension on the cable 16, the link 10 on the left will rotate counter clockwise relative to the link 12 on the right. When the tension in the cable 16 is reduced by the actuator 28, the force of the spring 26 will rotate the link 10 on the left in the clockwise direction relative to the link 12 on the right.

While in the particular embodiment of FIG. 1, the anchor points 22 are positioned symmetrically around the joint 14 and the cable guides 24 are symmetric around the joint 14, the positioning of the anchor points 22 and cable guides 24 is entirely design dependent and do not need to be symmetric around the joint 14 or the same distance from the joint 14. The location of the anchor points 22 for the cables 16 and 18 do not need to be next to each other on the link 10. The cables 16 and 18 could be implemented to share an anchor on the link 10. The joint 14 can be offset from the horizontal centerline of the links 10 and 12. As will be readily appreciated by persons of ordinary skill in the art, the positioning of the cable guides 24 relative to the joint 14 affects the torque exerted by the cables 16 and 18 and is design dependent. The positioning of the anchor points 22 also affects the torque applied to the links 10 and 12 and joint 14.

Figure 2:
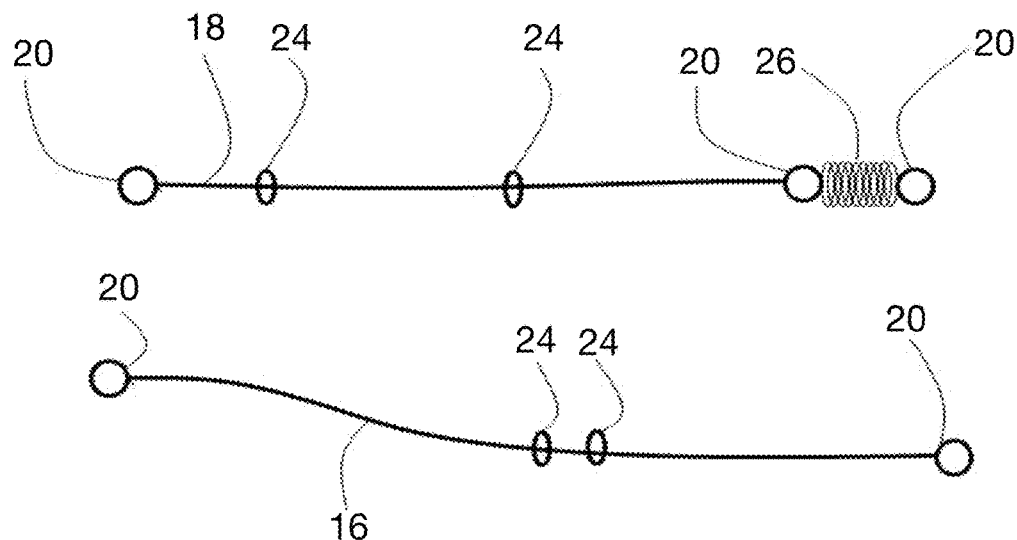
FIG. 2 is a diagram showing an embodiment of the present invention wherein two cables are configured to fit into the two links and a joint shown in FIG. 1

Referring now to FIG. 2, a diagram shows an aspect of the present invention wherein the cables depicted in FIG. 1 may be pre-assembled before being further assembled with the links and joints. According to one illustrative embodiment of the invention, the cables 16 and 18 include termination fittings 20 are shown in the form of rings connected to the ends of cables 16 and 18, although persons of ordinary skill in the art will appreciate that a wide variety of other termination fittings can be employed in the present invention. The cable guides 24 are pre-assembled in the correct order onto the cables 16 and 18 by threading the cables 16 and 18 through them. Any springs 26 that are used may also be pre-assembled on the cables 16 and 18 and positioned in the correct order with respect to the cable guides 24. The pre-assembled cables 16 and 18 shown in FIG. 2 may be manufactured having pre-specified lengths between the termination fittings 20. Persons of ordinary skill in the art will appreciate that the assembly shown in FIG. 2 is configured specifically for the link assembly depicted in FIG. 1, and is thus illustrative and non-limiting, as different numbers of cables and particular configurations will be required for various link arrangements.

One method for assembling the cables 12 is to attach a termination fitting such as a termination fitting 20 to the cable 12 using, for example, a Palomar knot, slide the necessary cable guides 24 onto the cable, cut the cable to the correct length and attach another termination ring 24 is attached to the second end of the cable. A Palomar knot 14 is particularly useful because it can be tied in a manner that consistently provides a known length consumption of cables 16 and 18. Therefore a cable can be assembled to desired lengths. Tying termination fittings 24 to a cable is one method to terminate a cable. Other options to terminate a cable can include gluing, fusing, crimping or any other method to attach a cable termination fitting 24 to the end of cables 16 and 18. Attaching the springs 26 can also be included as step in pre-assembling the cable. A pre-configured cable can then be assembled into a link and joint structure in a separate step from the assembly of the cable.

Referring now to FIG. 3, a diagram shows an embodiment of the present invention applied to the Stanford JPL cable configuration (J. K. Salisbury and J. J. Craig. Articulated hands: Force control and kinematic issues, *IJRR*, 1(1), Spring 1982) wherein a robotic hand 30, in which four links 32, 34, 36, and 38 are connected at three joints 40, 42, and 44 with four cables 46, 48, 50, and 52. In this example configuration, each cable 46, 48, 50, and 52 is terminated at an individual actuator 54, 56, 58, and 60. This configuration including links 32, 34, 36, and 38, joints 40, 42, and 44 and cables 46, 48, 50, and 52 allows full control of the relative joint angles between each link.

Referring now to FIG. 4, a diagram shows that, in this configuration, multiple cables may share one or more cable guides. FIG. 4 is a diagram that shows an embodiment of the present invention showing an illustrative example of pre-configured cables in an arrangement that addresses the requirements of FIG. 3 (StanfordJPLTendonConfiguration). There are a total of four cables 46, 48, 50, and 52. There is only a single cable 52 that uses a single cable guide 62 and does not share any cable guides with the other cables 46, 48, and 50. Three of the cables 46, 48, and 50 share a common subset of cable guides 64 and 66. Cable 50 includes two single cable guides 62.

A method to pre-assemble the set of three cables 46, 48, and 50 includes assembling a single cable 50, assembling the second cable 48 by sharing some of the cable guides 64, and assembling the third cable 46, again sharing some of the cable guides 64 and 66 with the other two cables 48 and 50. Once assembly of the three cables 46, 48, and 50 is complete, they constitute a single completed pre-assembled cable assembly.

Figure 5:
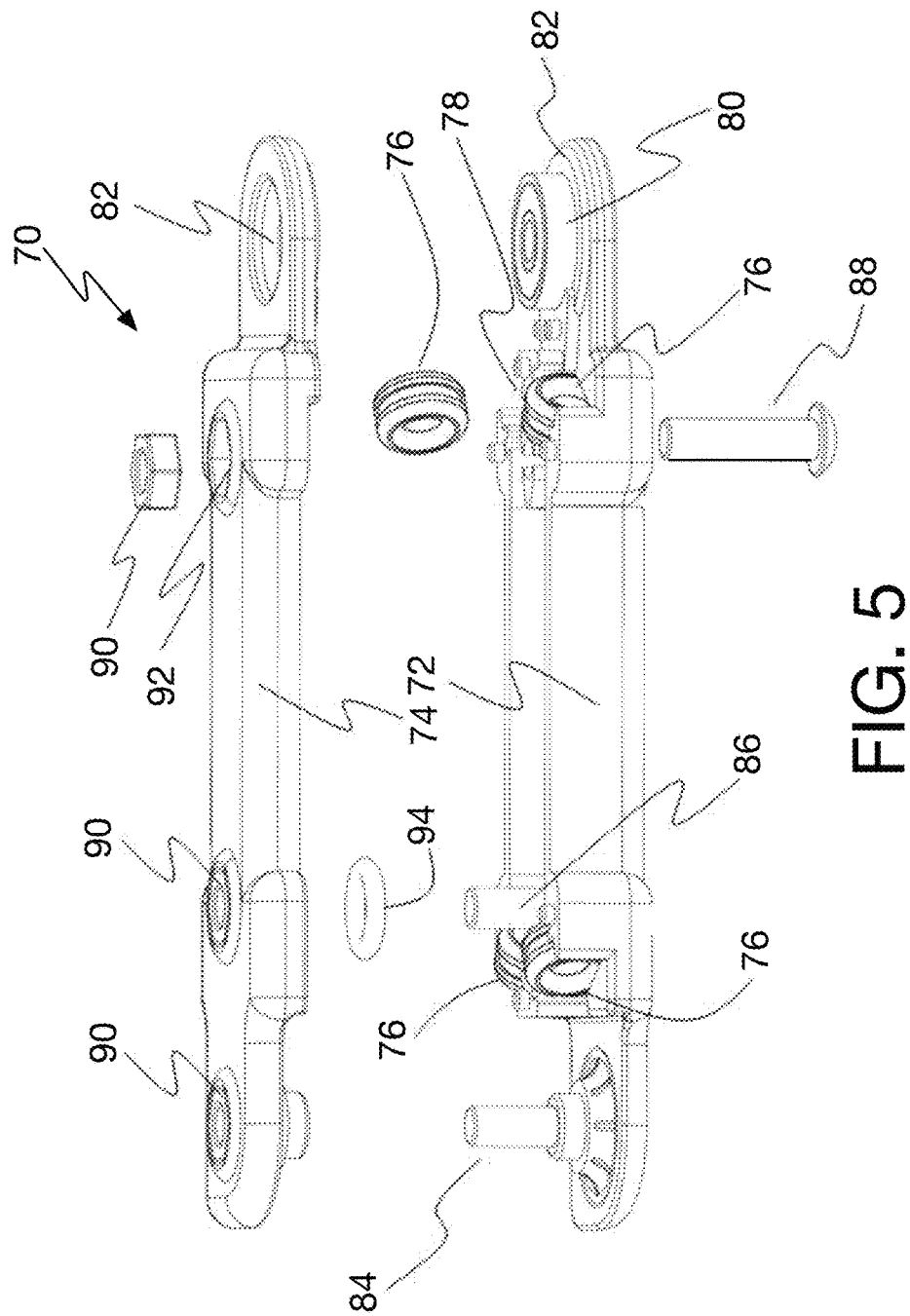
FIG. 5 is a diagram showing an embodiment of the present invention wherein a single link assembly is shown partially disassembled. No cable is shown in this picture.

Referring now to FIG. 5, a diagram shows an illustrative embodiment of the present invention wherein a link 70 is composed of pre-molded mating link sections 72 and 74. Cable guides 76 fit snugly into pre-formed locations 78. The cables are not shown in FIG. 5. In the illustrative example of FIG. 5, the cable guides are in the form of eyelets or grommets. A bearing 80 is seated into appropriately-formed recesses 82 in the link sections 72 and 74. Bolts 84, 86, and 88 pass through the link sections 72 and 74 and mate with nuts 90 to fasten link sections 72 and 74 to one another. As shown in FIG. 5, the nuts 90 may fit snugly into pre-formed locations 92 in link section 74. A cable termination ring 94 is shown without the cable. The termination ring 94 may be anchored to the link 70 by passing one of the bolts 86 through it or, for example, may rest in a recessed area as shown in some of the other embodiments. In the embodiment depicted in FIG. 5, one of the bolts 84 through a joint acts as an axle for the bearing of the next link (not shown). It is straightforward to assemble the link joint system using the cable assemblies as disclosed herein, avoiding any difficulty that might otherwise be encountered in assembling the cables after the links, bearings, cable guides, termination rings, bolts and nuts have been assembled.

Figure 6:
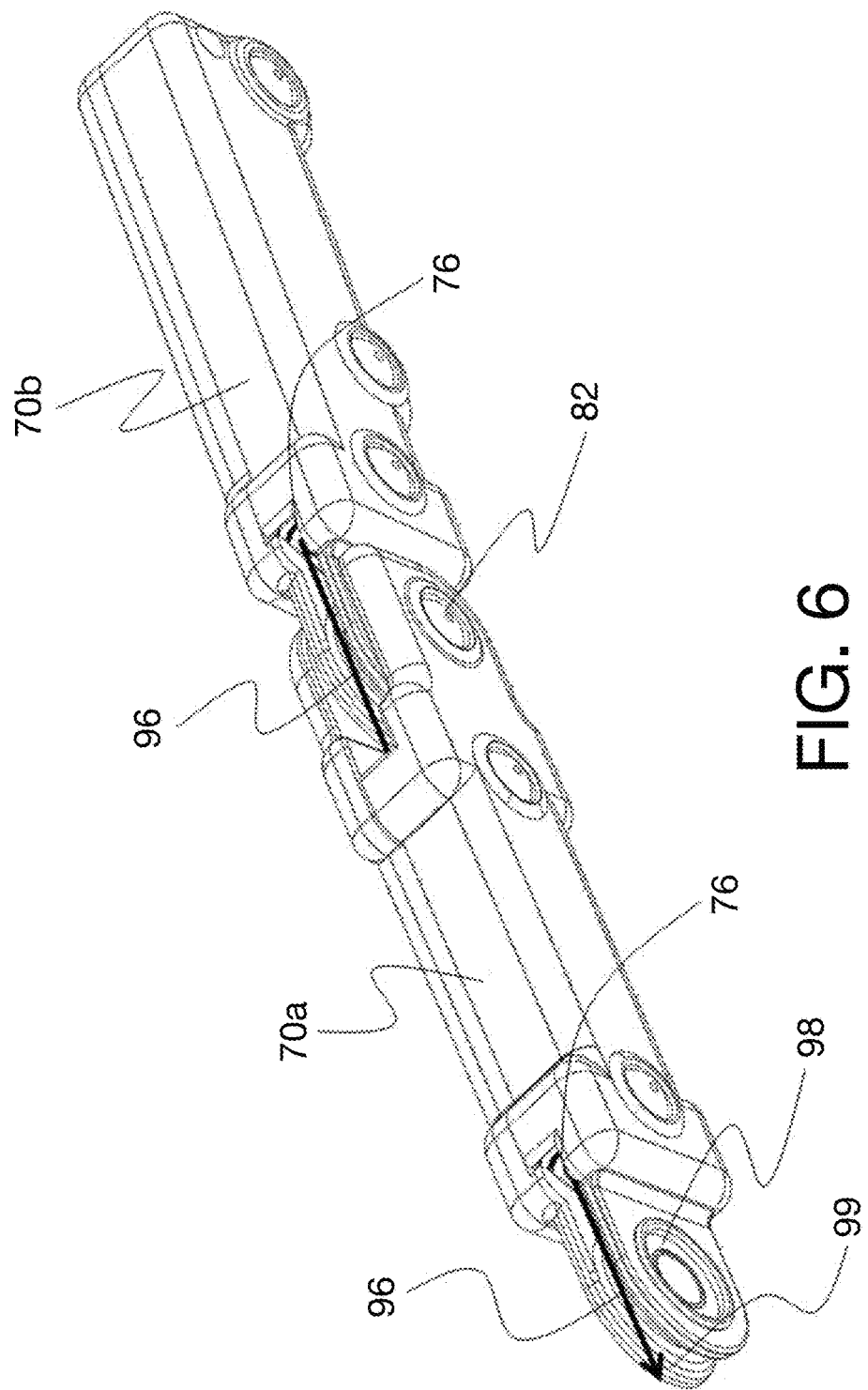
FIG. 6 is a diagram showing an embodiment of the present invention wherein two assembled links are shown.

Referring now to FIG. 6, a diagram shows an embodiment of the present invention wherein two links of the type illustrated in FIG. 5 are assembled. Links 70a and 70b are shown joined together as was indicated above with reference to FIG. 5. A cable 94 is visible passing between links 70a and 70b. Only the visible cable is shown and identified by reference numeral 96. The cable 96 passes through embedded cable guides 76, only two of which are visible in the view of FIG. 6. As previously noted with reference to FIG. 5, the bolt 84 may be employed to provide the axle for the joint between links 70a and 70b. A bearing 98 is visible at the joint where link 70a would be attached to other links (not shown). The cable 96 is shown at arrow 99 continuing beyond links 70a and 70b to connect to actuators, springs, other cables or other termination (not shown).

Figure 7:
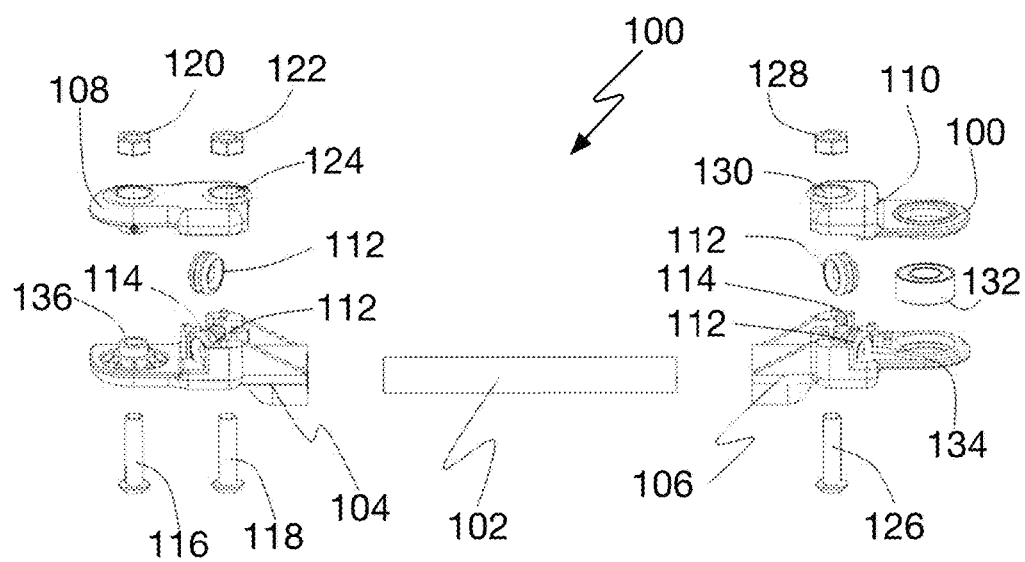
FIG. 7 is a diagram showing an exploded isometric view of an exemplary link in accordance with an embodiment of the present invention including a shaft and two end pieces.

Referring now to FIG. 7, a diagram shows an exploded view of an embodiment of the present invention wherein a link 100 is formed from a shaft 102 and two end pieces 104 and 106. A cover 108 is shown removed from end piece 104 and a cover 110 is shown removed from end piece 106. Cable guides 112 are seated in preformed recesses 114 (two of which are shown prior to placement in recesses 114).

Bolts 116 and 118 are used to secure cover 108 to end piece 104 using nuts 120 and 122, respectively. Nuts 120 and 122 may fit into recesses (one is shown at reference numeral 124) pre-formed in cover 108. Bolt 116 also serves as an axle for a bearing (not shown) used to couple link 100 to another link that would be located to the left of the figure. Bolt 126 is used to secure cover 110 to end piece 106 using nut 128. Nut 128 may fit into recess 130 pre-formed in cover 110.

A bearing 132 sits in bearing seat 134 formed in end piece 106 and is used to couple link 100 to another link that would be located to the right of the figure. Such a link would be secured to link 100 on a bearing shoulder identical to shoulder 136 using a bolt such as bolt 116 shown in the left side of FIG. 6.

Figure 8:
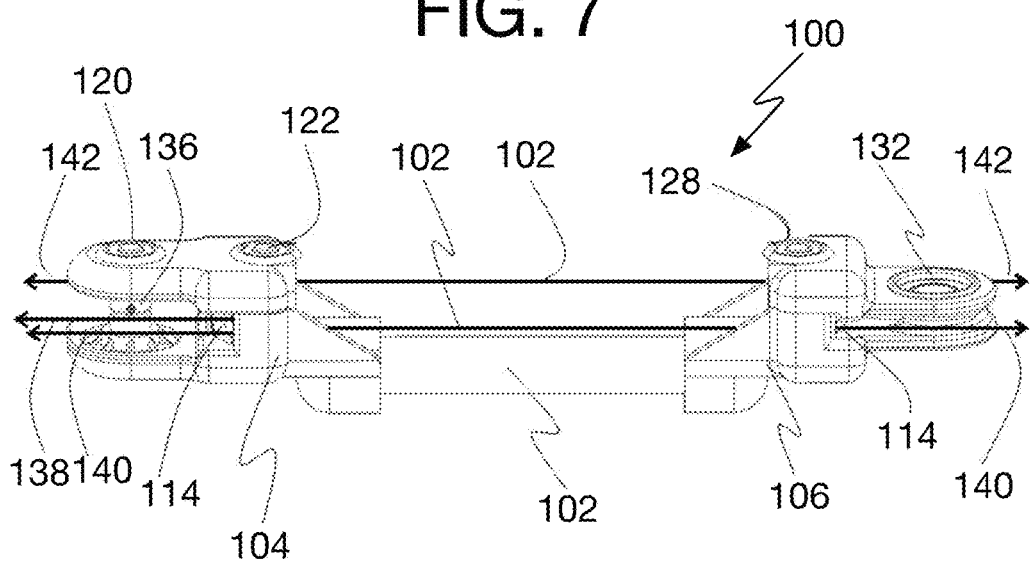
FIG. 8 is a diagram showing an assembled isometric view of the link of FIG. 7 including an exploded view of the end pieces to show interior detail.

Referring now to FIG. 8, a diagram shows an assembled view of the link 100 shown in FIG. 7. The same reference numerals used in FIG. 7 are used to designate corresponding structure in FIG. 8. The link is shown with shaft 102 fastened to the two end pieces 104 and 106, such as by gluing or use of other known fastening techniques. End pieces 104 and 106 are shown assembled to secure the hardened eyelets 114. The joint bearing 132 fits into molded shoulders 136 in the right most end piece 106 (as seen on the left hand side of FIG. 8). The left most end piece 104 has an axle formed from bolt 116 in shoulder 136 (seen most easily in FIG. 7) onto which the bearing in the next link (not shown) fits. The end piece 104 and its cover (seen in FIG. 7) are secured by bolts 116 and 118 and nuts 120 and 122. The right most end piece 106 and its cover (seen in FIG. 7) are secured by bolt 126 and nut 128. Nuts 120, 122, and 128 fit into pre-molded locations (124 in FIG. 7).

There are three cables 138, 140, and 142 shown passing through the link 100 in FIG. 8. Cable 138 is anchored in the left most end piece 104 by bolt 122. Cable 140 is shown passing through cable guides 114. Cable 142 passes through cable guides that are not visible in the drawing.

Referring now to FIG. 9, a diagram shows an embodiment of the present invention wherein two links of the type shown in FIGS. 7 and 8 are assembled together at a center joint 144. Four cables at reference numeral are shown exiting the right most end piece 106b. One of the cables is anchored into the right most end piece 102b by a bolt 146. In the center joint, a cable (not visible) is anchored by bolt 148, serving as the axis of the joint. In the center joint a cable 150 passes between cable guides 152 embedded into the joint. Two cables exit the left most end piece 104a at reference numeral 154.

Figure 10:
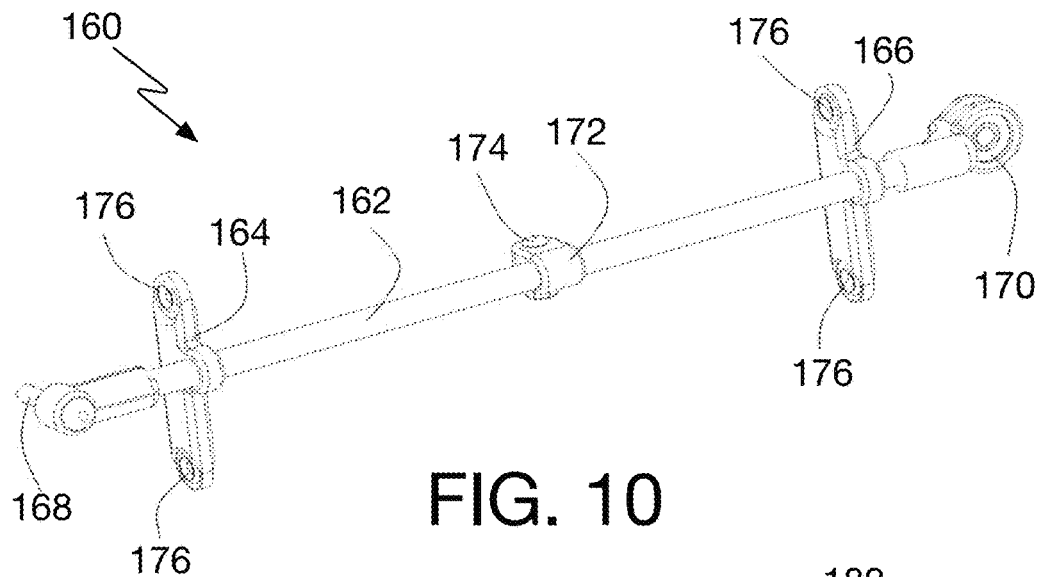
FIG. 10 is a diagram showing an assembled isometric view of an illustrative embodiment of the present invention wherein a link includes a shaft, two cable guide holders, two end pieces, and a cable anchor piece.

Referring now to FIG. 10, a diagram shows an embodiment of the present invention wherein a link 160 is formed from a shaft 162, two cable guide holders 164 and 166, two end pieces 168 and 170, and a cable anchor piece 172. Cables (not shown) pass through the link. The cables pass through cable guides 176 and one or more of the cables may be anchored by a bolt 174 in the cable anchor piece 172. Persons of ordinary skill in the art will appreciate that cable anchor piece 172 could be located between one of the cable guide holders 164 and one of the end pieces 168 or 170.

Figure 11:
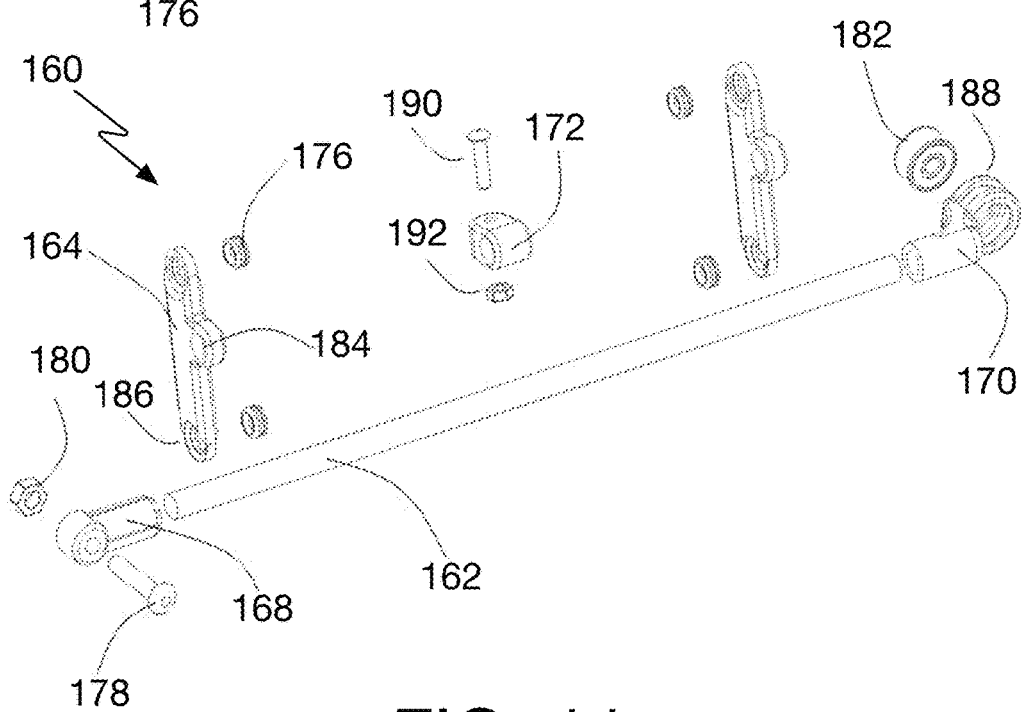
FIG. 11 is a diagram showing an exploded isometric view of the embodiment of FIG. 10.

Referring now to FIG. 11, a diagram shows an exploded view of the link 160 of FIG. 10. The shaft 162 is connected to end pieces 168 and 170 by inserting shaft 162 into holes in the end pieces 168 and 170. In the illustrative embodiment shown in FIGS. 10 and 11, the end pieces 168 and 170 are complementary. One end piece 168 accepts a bolt 178 held by nut 180. Bolt 178 provides an axis for a bearing 182 seated in the other end piece 170. The cable guide holders 164 and 166 fit onto the shaft 162 through mounting holes 184. The cable guides 176 snap into holes 186 in the cable guide holders 164 and 166. The joint bearing 182 snaps into the right most end piece 170. The right most end piece 170 has molded shoulders 188 that hold the edges of the outer race of joint bearing 182. This allows the use of a concave joint bearing 182 to provide centering alignment when a tendon passes over the outer bearing race. Cable anchor 172 is coupled to shaft 162 by a bolt 190 and nut 192 to secure a cable.

Referring now to FIG. 12, a diagram shows an embodiment of the present invention wherein two links of the type shown in FIGS. 10 and 11 are assembled together at a joint 194. The cables pass through cable guides 176. A cable is shown anchored at reference numeral 190. Two cables are shown passing over the joint bearing outer race 188. Persons of ordinary skill in the art will appreciate that if cable anchor piece 172 is located between one of the cable guide holders 164 and the one of the end pieces 168 or 170 at joint 194, that the cable anchored to it will not need to pass through the cable guides connected to shaft 162a Referring now to FIGS. 13A through 13I are diagrams showing different illustrative embodiments of the present invention wherein two links are connected by a joint and are shown using various control and/or passthrough cabling combinations.

In all of FIGS. 13A through 13I, two links 202 and 204 are shown connected by a joint 206. The links 202 and 204 rotate about the joint 206 and may be controlled by torques induced by cables anchored to one of the links.

Figure 13A:
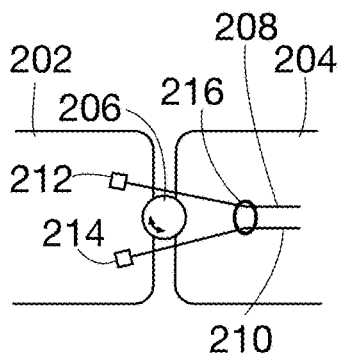
FIGS. 13A through 13I are diagrams showing different illustrative embodiments of the present invention wherein two links are connected by a joint and are shown using various control and/or passthrough cabling combinations.

In the illustrative embodiment shown in FIG. 13A, the cables 208 and 210 have termination fittings (not shown) secured to the link 202 at anchor points 212 and 214, respectively, shown as small squares at the ends of the cables 208 and 210. The cables 208 and 210 pass through a cable guide 216 secured into link 204 at the points where the cables 208 and 210 need to be guided through the link 204. Because of the different positions of the anchor points 212 and 214, link 202 may be moved in two different directions by selectively placing tension on cables 208 and 210.

Figure 13B:
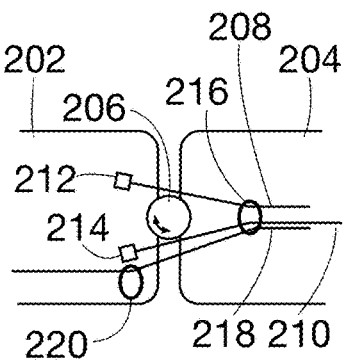

In the illustrative embodiment shown in FIG. 13B, the cables 208 and 210 have termination fittings (not shown) secured to the link 202 at anchor points 212 and 214, respectively, shown as small squares at the ends of the cables 208 and 210. The cables 208 and 210 pass through a cable guide 216 secured into link 204 at the points where the cables 208 and 210 need to be guided through the link 204. In the embodiment of FIG. 13B, a third cable 218 passes through cable guide 216 in link 204, and also passes through cable guide 220 in link 202. Cable 218 is a "passthrough" cable and is not anchored to either of links 202 or 204, but continues on to other links (not shown) located past the left and right edges of FIG. 13B.

Figure 13C:
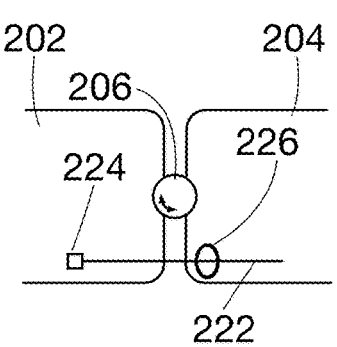

In the illustrative embodiment shown in FIG. 13C, a single cable 222 has a termination fitting (not shown) secured to the link 202 at anchor point 224. The cable 222 passes through a cable guide 226 secured into link 204 at the point where the cable 222 needs to be guided through the link 204.

Figure 13D:
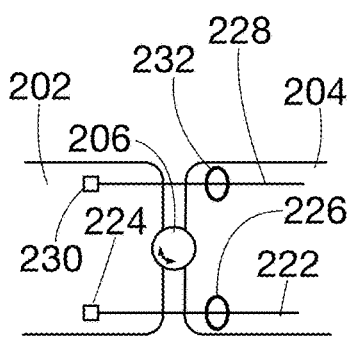

In the illustrative embodiment shown in FIG. 13D, a cable 222 has a termination fitting (not shown) secured to the link 202 at anchor point 224 as in FIG. 13C. The cable 222 passes through a cable guide 226 secured into link 204 at the point where the cable 222 needs to be guided through the link 204. Another cable 228 has a termination fitting (not shown) secured to the link 202 at anchor point 230. The cable 228 passes through a cable guide 232 secured into link 204 at the point where the cable 232 needs to be guided through the link 204.

Figure 13E:
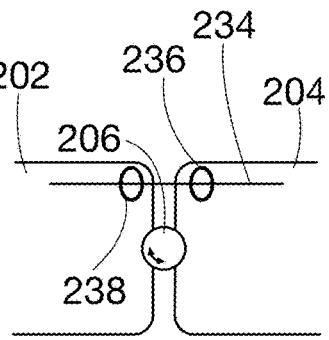

In the illustrative embodiment shown in FIG. 13E, a single passthrough cable 234 passes through links 202 and 204. The cable 234 passes through a cable guide 236 secured into link 204 at the point where the cable 234 needs to be guided through the link 204. The cable 234 also passes through a cable guide 238 secured into link 202 at the point where the cable 234 needs to be guided through the link 202. Cable 234 continues on to other links (not shown) located past the left and right edges of FIG. 13E.

Figure 13F:
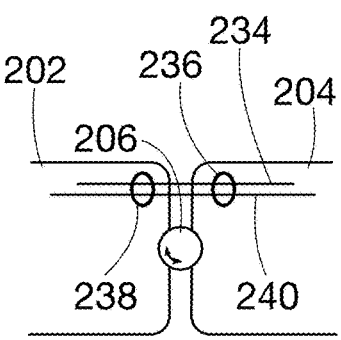

In the illustrative embodiment shown in FIG. 13F, the same single passthrough cable 234 of FIG. 13E passes through links 202 and 204. The cable 234 passes through a cable guide 236 secured into link 204 at the point where the cable 234 needs to be guided through the link 204. The cable 234 also passes through the cable guide 238 secured into link 202 at the point where the cable 234 needs to be guided through the link 202. Another passthrough cable 240 passes through links 202 and 204. The cable 240 passes through the same cable guide 236 in link 202 as does cable 234. Cables 234 and 240 continue on to other links (not shown) located past the left and right edges of FIG. 13F.

Figure 13G:
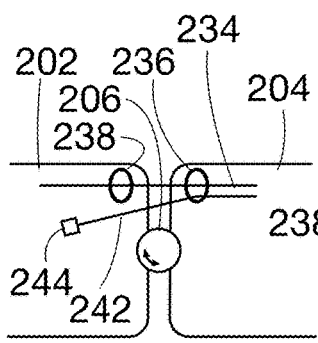

In the illustrative embodiment shown in FIG. 13G, the same single passthrough cable 234 of FIGS. 13E and 13F passes through links 202 and 204. The cable 234 passes through a cable guide 236 secured into link 204 at the point where the cable 234 needs to be guided through the link 204. The cable 234 also passes through the cable guide 238 secured into link 202 at the point where the cable 234 needs to be guided through the link 202. A second cable 242 passes through link 204 and is anchored in link 202 at anchor point 244. The cable 242 passes through the same cable guide 236 in link 202 as does cable 234, but does not pass through cable guide 238 in Link 202.

Figure 13H:
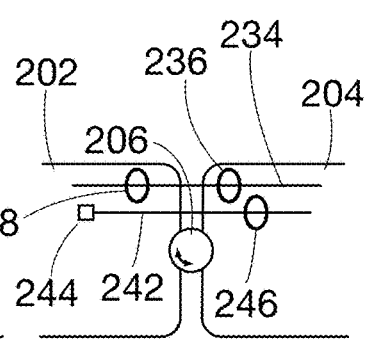

In the illustrative embodiment shown in FIG. 13H, the same single passthrough cable 234 of FIGS. 13E through 3G passes through links 202 and 204. The cable 234 passes through a cable guide 236 secured into link 204 at the point where the cable 234 needs to be guided through the link 204. The cable 234 also passes through the cable guide 238 secured into link 202 at the point where the cable 234 needs to be guided through the link 202. As in the embodiment shown in FIG. 3G, a second cable 242 passes through link 204 and is anchored in link 202 at anchor point 244. The cable 242 does not pass through the same cable guide 236 in link 202 as does cable 234, but instead passes through a second cable guide 246 in link 202.

Figure 13I:
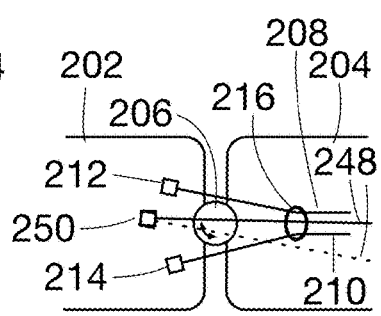

Referring now to FIG. 13I, another embodiment similar to the one shown in FIG. 13A is shown. Like the illustrative embodiment shown in FIG. 13I, the cables 208 and 210 have termination fittings (not shown) secured to the link 202 at anchor points 212 and 214, respectively, shown as small squares at the ends of the cables 208 and 210. The cables 208 and 210 pass through a cable guide 216 secured into link 204 at the points where the cables 208 and 210 need to be guided through the link 204.

In addition to cables 208 and 210 in FIG. 13A, the embodiment shown in FIG. 13I includes a third cable 248 anchored to link 202 at anchor point 250. In one version of this embodiment, cable 248 passes through cable guide 216 and in another version of this embodiment (where it is shown in dashed lines), cable 248 does not pass through cable guide 216. As will be appreciated by persons of ordinary skill in the art, cable 248 could be passed through another cable guide (not shown) or may not pass through a cable guide at this location in the mechanism. As will be appreciated by persons of ordinary skill in the art, because of the different positions of the anchor points 212, 214 and 250, link 202 may be moved in three different directions by selectively placing tension on cables 208, 210 and 248.

In all of the embodiments shown in FIGS. 13A through 13I, all of the cable guides 216, 220, 226,232, 236, 238, and 246 are preferably high hardness cable guides as taught herein. The use of high hardness cable guides significantly reduces the wear to which the cable tendons are subjected over the lifetime of the robotic manipulator in which they are used.

The present invention allows building very small mechanical manipulators with the following benefits over the prior art: reduced component cost, reduced assembly cost, reduced part count, reduced friction, longer wear life, great shock resistance, light weight and decreased moment of inertia.

This invention allows building small robots with "legs" or appendages, large robots, such as humanoids as well as improved prosthetic hands and robotic mechanical manipulators. The invention can be further applied where ever forces can be applied over a distance using a Bowden cable, cable or rope to transmit tension.

The use of ultra-hard ceramic to implement highly polished high hardness cable guides and the use of super strong synthetic braided line create a very cost effective and robust cable tension system that uses few inexpensive parts that are easy to assemble and have excellent wear and low friction characteristics.

The reduced component costs result from the combined costs of the hard ceramic guides and cable. The high hardness cable guides are simple components and can be sourced for less expense than pulleys. Cable, such as braided Dyneema or similar materials, is a widely-available inexpensive commodity.

Reduced assembly cost can be achieved by separating assembly into sub-systems such as the pre-configured cables including cable guides and termination rings, from the assembly of the link and joint structure.

The present invention provides a system having reduced friction at points where the cable is redirected. The friction of the cable is reduced as compared to the Bowden cable solution.

The present invention separates actuators from links and joints, and minimizes mass and moment of inertia for links and moves mass and moment of inertia to a better location (centralized body, for example, in an embodiment). Links and joints can be smaller. Links and joints are more shock resistant.

In various embodiments, joints can be implemented using bearings, bushings, rods or similar elements. This present invention can also be used in mechanical manipulators that utilize springs as the joints instead of having a sliding or rolling joint. Examples include metal or rubber spring joints.

The invention can be used where joints are multi-dimensional, such as a universal joint or a rubber joint.

The invention can be applied to non-robotic structures such as a cable actuation system in bicycle gears and brakes or other applications utilizing Bowden cables or pulleys.

Although the invention has been described in detail by illustrative embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

What is claimed is:

1. A robotic manipulator structure comprising:
   a plurality of robotic manipulator links coupled end to end to each other by rotatable joints to form one of a robot appendage and a robotic appendage coupled to a robotic body;
   a first one of the robotic manipulator robotic manipulator links coupled to a second one of the robotic manipulator links by a first rotatable joint;
   a first cable guide completely disposed within the second robotic manipulator link proximate to an end closest to the rotatable joint, the first cable guide including a cable guide body having an aperture formed therein; and
   a first cable that transfers mechanical force between two of the robotic manipulator links, the first cable passing between the first robotic manipulator link and the second robotic manipulator link, the first cable passing through and surrounded by the cable guide body in the first cable guide in the second robotic manipulator link.

2. The robotic manipulator structure of claim 1 wherein the appendage is one of a gripper, hand, a finger, an arm, and a leg.

3. The robotic mechanical manipulator structure of claim 1 further comprising:
   a second cable guide completely disposed within the first robotic manipulator link proximate to an end closest to the rotatable joint, the second cable guide including a cable guide body having an aperture formed therein; and wherein
   the first cable passes through and is surrounded by the apertures in both the first and the second cable guides.

4. The robotic mechanical manipulator structure of claim 1 further comprising:
   a second cable that transfers mechanical force between two of the robotic manipulator links, the second cable passing between the first robotic manipulator link and the second robotic manipulator link, the second cable passing through and surrounded by the aperture in the second cable guide in the first robotic manipulator link.

5. The robotic mechanical manipulator structure of claim 3 further comprising:
   a second cable that transfers mechanical force between two of the robotic manipulator links, the second cable passing through and surrounded by the apertures in both the first and the second cable guides.

6. The robotic mechanical manipulator structure of claim 1 further comprising:
   a cable guide mount disposed in the second link, the cable guide mount configured to retain the first second-link cable guide body in a position to receive the first cable passing between the first robotic manipulator link and the second robotic manipulator link.

7. The robotic mechanical manipulator structure of claim 3 further comprising:
   a first cable guide mount disposed in the second robotic manipulator link, the first cable guide mount configured to receive and retain the first cable guide body in a position to receive the first cable passing between the first robotic manipulator link and the second robotic manipulator link; and
   a second cable guide mount disposed in the first link, the second cable guide mount configured to receive and retain the second cable guide body in a position to receive the first cable passing between the first robotic manipulator link and the second robotic manipulator link.

8. The robotic mechanical manipulator structure of claim 1 wherein an end of the first cable is connected to an anchor point in the first robotic manipulator link to transfer force between the first robotic manipulator link and the second robotic manipulator link.

9. The robotic mechanical manipulator structure of claim 4, wherein an end of at least one of the first and second cables is connected to an anchor point in the first robotic manipulator link.

10. The robotic mechanical manipulator structure of claim 9, wherein an end of the first cable is connected to a first anchor point in the first robotic manipulator link and an end of the second cable is connected to a second anchor point in the robotic manipulator first link.

11. The robotic mechanical manipulator structure of claim 4 further comprising:
    a third cable passing between the first robotic manipulator link and the second robotic manipulator link, the third cable.

12. The robotic mechanical manipulator structure of claim 11, wherein an end of at least one of the first, second, and third cables is connected to an anchor point in the first robotic manipulator link.

13. The robotic mechanical manipulator structure of claim 3 further comprising:
    a third cable passing between the first robotic manipulator link and the second robotic manipulator link, the third cable passing through and surrounded by cable guide apertures in both the first robotic manipulator link and the second robotic manipulator link.

14. The robotic mechanical manipulator structure of claim 1 further comprising:
    a cable guide mount disposed in the first link, the cable guide mount configured to retain the second cable guide in a position to receive the first cable passing from the first robotic manipulator link to the second robotic manipulator link; and
    a second cable guide mount disposed in the second robotic manipulator link, the second cable guide mount configured to retain the first cable guide in a position to receive the first cable passing from the first robotic manipulator link to the second robotic manipulator link.

15. The robotic mechanical manipulator structure of claim 1, further comprising:
    a third cable guide disposed in the second robotic manipulator link, the third cable guide including a cable guide body having an aperture formed therein; and
    a second cable passing between the first robotic manipulator link and the second robotic manipulator link, the second cable passing through and surrounded by the aperture in the third cable guide in the second robotic manipulator link.

16. A prefabricated cable assembly for a robotic mechanical manipulator comprising:
    a first cable having a preselected length;
    a first mechanical termination fitting at a first end of the cable;
    at least one cable guide including a cable guide body shaped to slide into a cable guide mount in a robotic manipulator link, the cable guide body having an aperture formed therein through which the first cable passes, the cable guide body surrounding the first cable and configured to slide into a cable guide mount in one of a robot appendage and a robotic appendage coupled to a robotic body.

17. The prefabricated cable assembly of claim 16, further comprising:
- a second cable having a preselected length and a mechanical termination fitting on a first end thereof;
- a second cable guide including a cable guide body having an aperture formed therein through which the first and second cables pass, the second cable guide body surrounding the first and second cables.

18. The prefabricated cable assembly of claim 16, further comprising a second mechanical termination fitting at a second end of the cable.

19. A robotic manipulator link for a robotic mechanical manipulator comprising:
- a first section having a first end and a second end;
- a second section having a first end and a second end, the second section configured to mate with the first section;
- at least one cable guide mount disposed in at least one of the first and second sections proximate to one of the first and second ends thereof, the at least one cable guide mount configured to receive and retain at least one cable guide;
- at least one cable guide body having an aperture formed therethrough, the at least one cable guide body disposed in the at least one cable guide mount.

20. The robotic manipulator link of claim 19 wherein the at least one cable guide mount is a slot that receives the at least one cable guide body.

\* \* \* \* \*